Jan. 15, 1929.
A. E. F. MOONE
1,698,765
GROUPING MACHINE
Filed Aug. 1, 1927
6 Sheets-Sheet 1
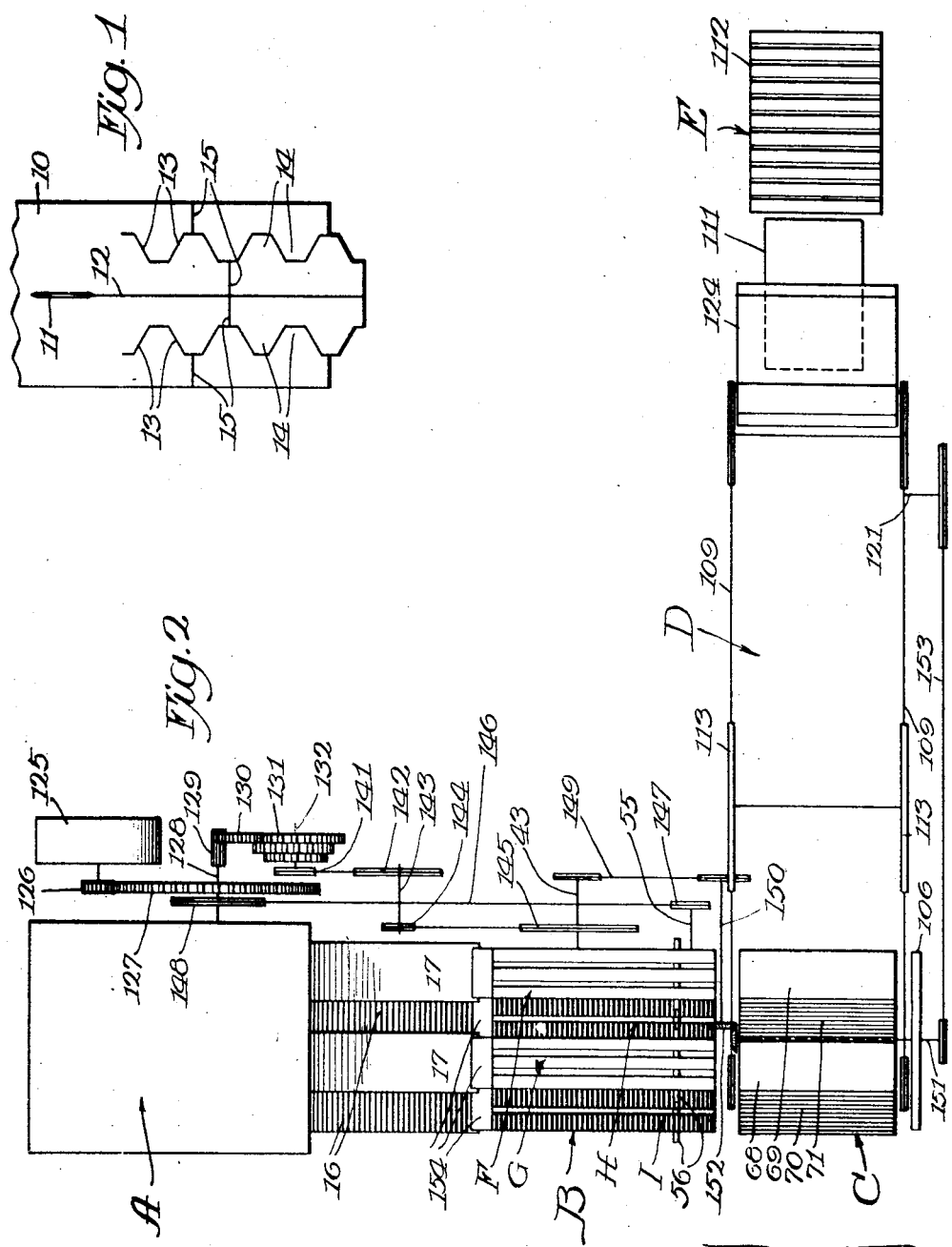

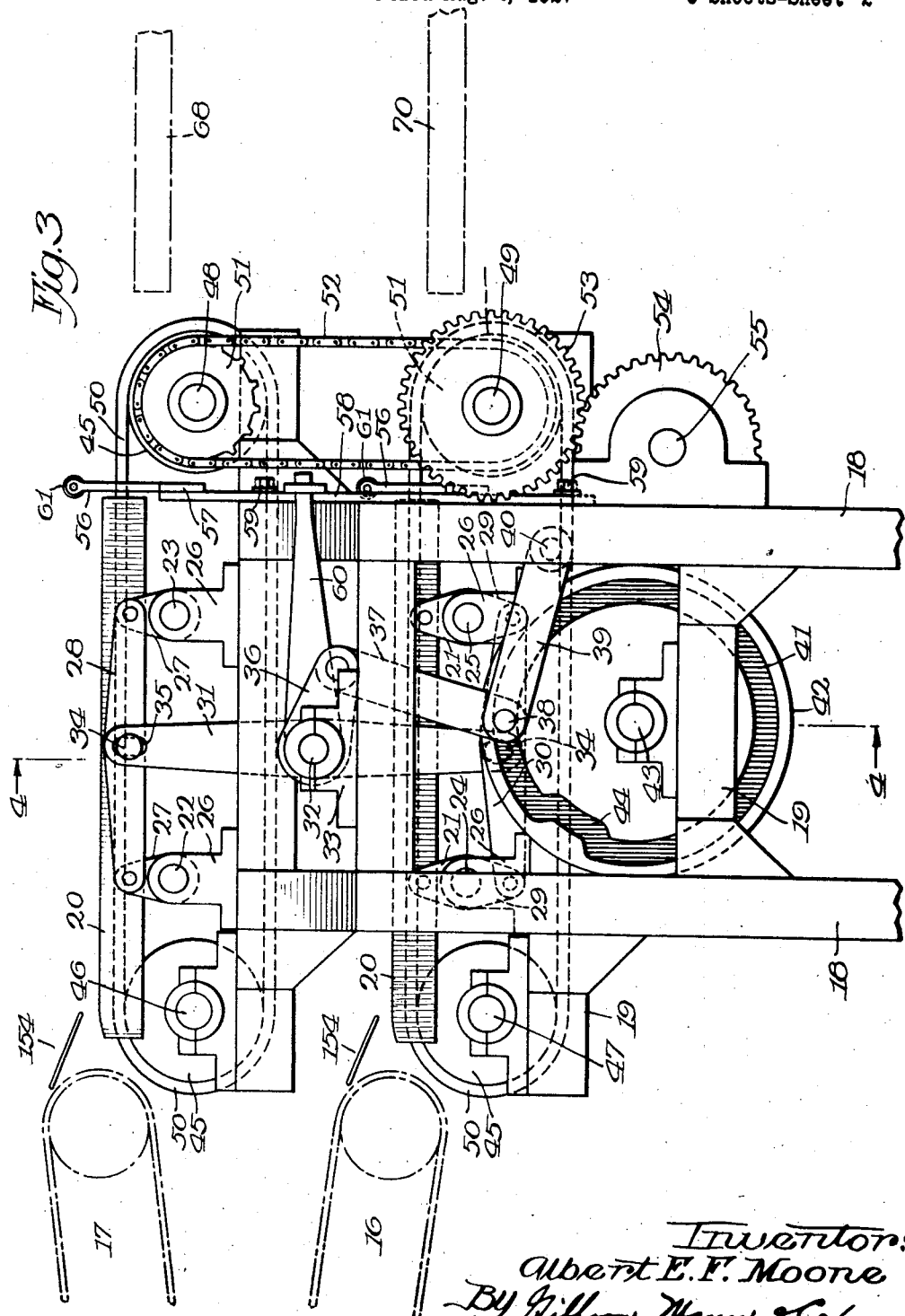

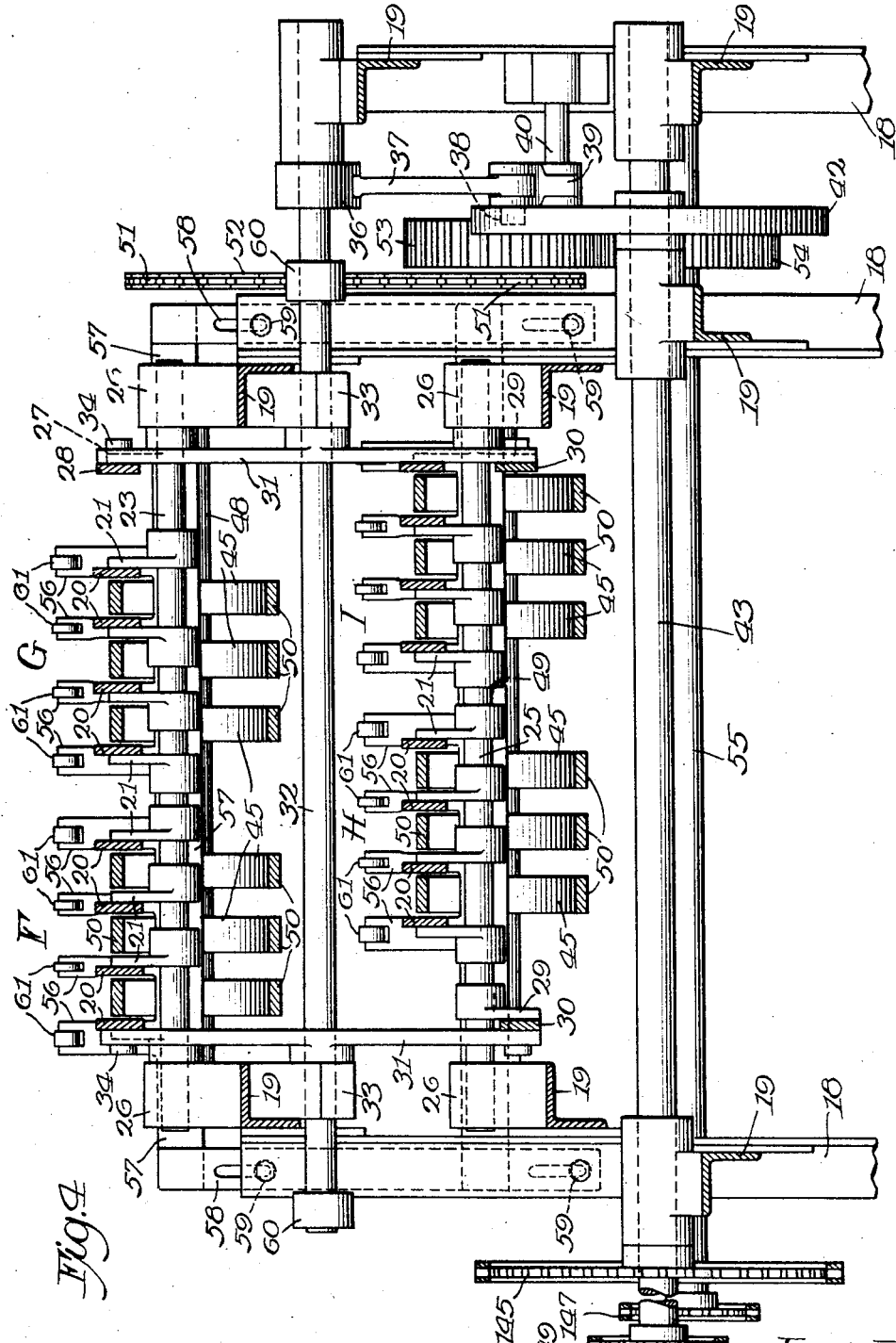

Jan. 15, 1929.
A. E. F. MOONE
1,698,765
GROUPING MACHINE
Filed Aug. 1, 1927
6 Sheets-Sheet 4
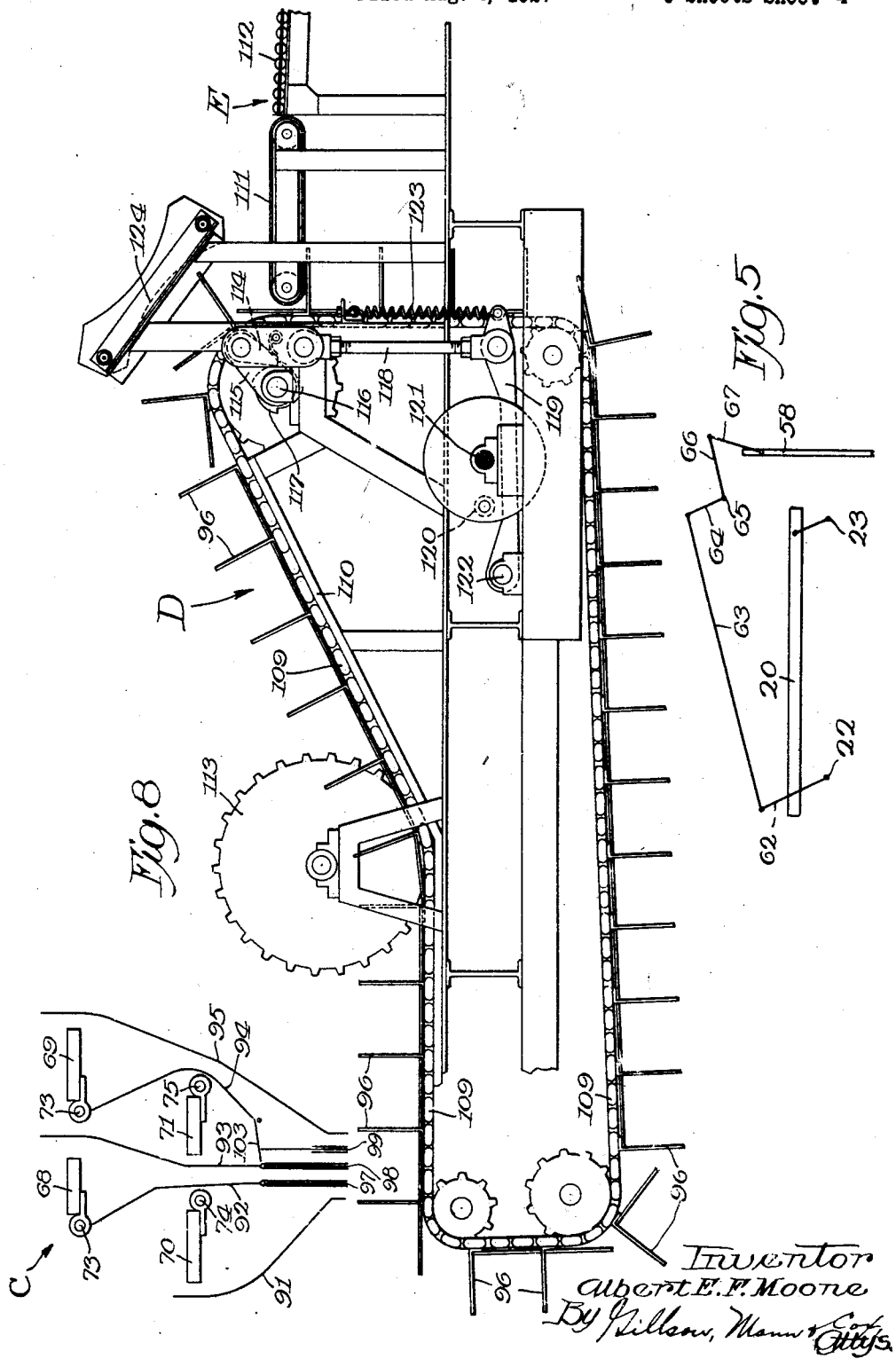

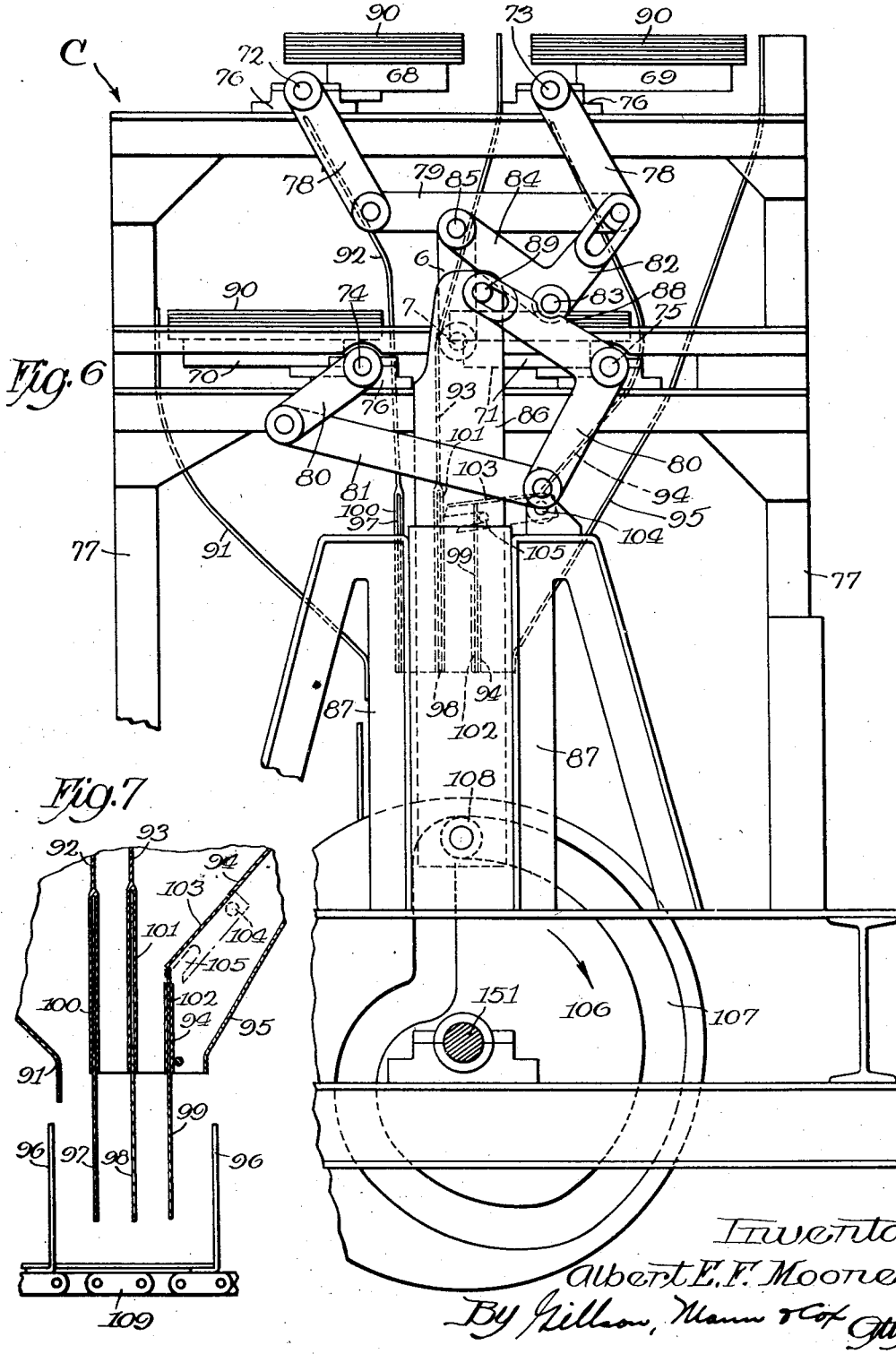

Jan. 15, 1929.  1,698,765
A. E. F. MOONE
GROUPING MACHINE
Filed Aug. 1, 1927   6 Sheets-Sheet 6
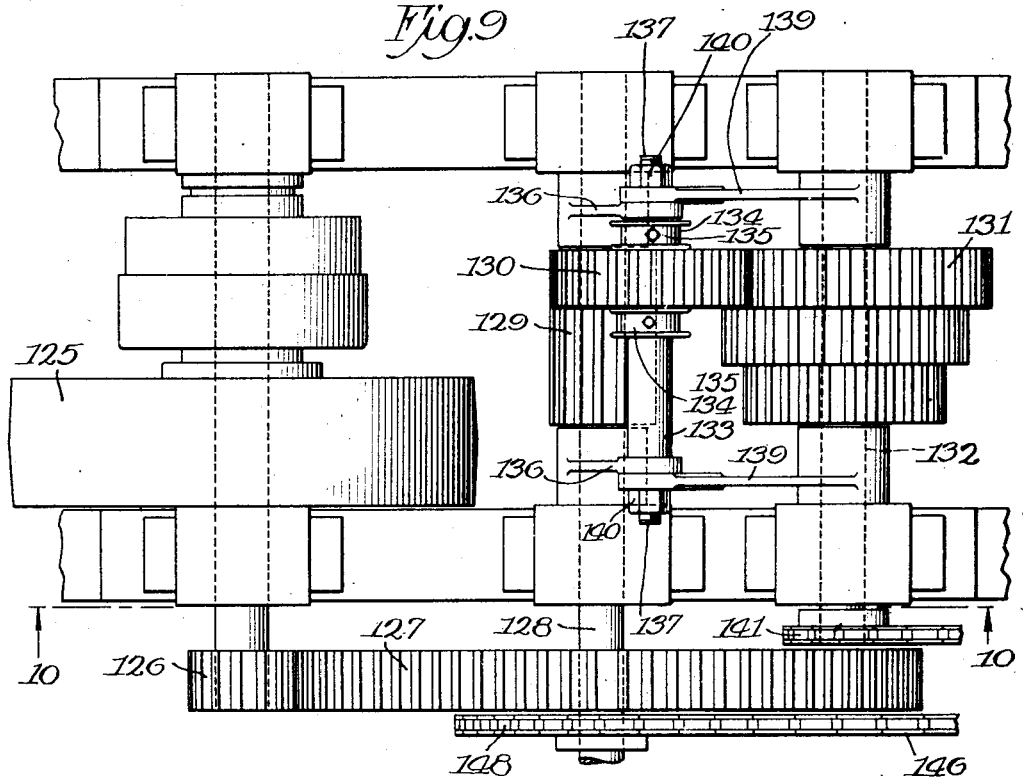
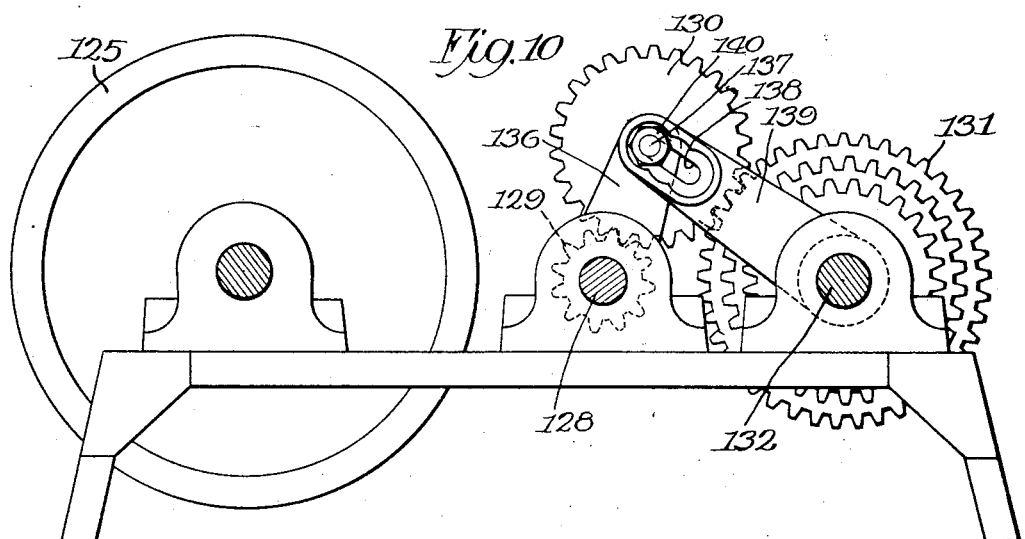
Inventor:
Albert E. F. Moone Patented Jan. 15, 1929.

1,698,765

UNITED STATES PATENT OFFICE.

ALBERT E. F. MOONE, OF CHICAGO, ILLINOIS, ASSIGNOR TO THE LEHON COMPANY, A CORPORATION OF ILLINOIS.

GROUPING MACHINE.

Application filed August 1, 1927. Serial No. 209,754.

This invention relates to grouping machines and has for its principal object to permit shingles delivered in a plurality of series to be grouped in numbers suitable for packaging; to provide improved means for consolidating a plurality of series of shingles into suitable groups and to generally improve machines of this class.

Further objects and advantages of the invention will become apparent as the disclosure proceeds and the description is read in connection with the accompanying drawings, illustrating a particular embodiment especially adapted for use with known machines for manufacturing a particular shingle strip and in which Fig. 1 is a diagrammatic plan view of a strip of roofing illustrating how it is cut to form shingle strips, each having a plurality of tabs of semi-hexagonal form;

Fig. 2 is a diagrammatic plan view of a portion of a known shingle making machine and grouping apparatus embodying this invention;

Fig. 3 is a side elevation of one unit of the grouping mechanism, the delivery belts of the shingle machine being indicated diagrammatically at the left, and the group receiving supports of another element being indicated diagrammatically at the right;

Fig. 4 is a transverse sectional view taken on the line 4—4 of Fig. 3;

Fig. 5 is a diagrammatic illustration of an alternative means for controlling the limiting fingers;

Fig. 6 is a side elevation of another element of the grouping mechanism;

Fig. 7 is a diagrammatic view showing the lower portion of Fig. 6 to better advantage than it is depicted in Fig. 6;

Fig. 8 is a side elevation of another unit which receives groups of shingles from the unit shown in Fig. 6, the latter being shown in diagrammatic outline at the upper left hand corner, and Figs. 9 and 10 are plan and side elevation respectively of transmission mechanism forming a part of the drive for the apparatus.

But this specific illustration and the correspondingly specific description are used solely for the purpose of fully disclosing this illustrative embodiment of the invention and are not intended to impose limitations on the claims that would permit the substance of the invention to be otherwise embodied and used without infringement.

In Fig. 1, 10 indicates a continuous sheet of roofing of sufficient width to form four shingle strips of the type mentioned. This strip is divided at 11 by a straight cut 12. Each division is then cut on the broken line 13 to form tabs 14 and is also cut on the right lines 15 to form shingle strips, each having a plurality of tabs 14. Machines for doing this work are known in the art and need not be illustrated or described in detail.

It will be sufficient to say that such a machine is indicated diagrammatically at A (Fig. 2) and includes two downwardly inclined delivery belts 16 and two upwardly inclined delivery belts 17. When the sheet cut as indicated in Fig. 1 reaches these belts they separate the individual shingle strips and deliver them at two different elevations and at two different places at the same elevation. The result is four streams of consecutive shingle strips issuing from the machine A at the ends of the belts 16 and 17.

The specific problem overcome by this invention consists generally in receiving those streams and converting them into piles or groups of shingles ready for packaging in sizes suitable for handling and shipping.

The first element of the grouping apparatus is generally indicated at B (Fig. 2). It collects the several series of shingles into four groups or sub-groups, depending upon the wish of the operator. In some instances this unit will be all that is desired for it will permit proper grouping while the shingle machine runs continuously at a high speed.

In other instances it will be desirable to have the unit B deliver its four sub-groups of shingles to a unit C (Fig. 2) which will consolidate them into one group and, by means of a conveyor D, deliver them to a table E from which they pass to the binding operation.

The unit B is built upon a frame consisting generally of four uprights 18 connected by cross pieces 19. Carried by this frame are a plurality of bars or rails 20 arranged in four sets, indicated generally by F, G, H and I, said sets corresponding in number and position to the delivery of the four series of shingles.

The bars 20 are each pivoted to two arms 21, all such arms being carried by four shafts 22, 23, 24 and 25, each journaled in suitable bearings 26, supported upon a cross piece 19 of the frame. The shafts 22 and 23 each have an arm 27 pivoted at the opposite ends of a link 28, and each shaft 24 and 25 has an arm 29 pivoted at the opposite ends of a link 30. The links 28 and 30 are connected for joint movement by a lever 31, mounted on a shaft 32, journaled in bearings 33 on a frame member 19. The connection between the lever and the links is made by a pin 34 on each link cooperating with the slot 35 in the lever. Obviously, by rocking the lever 31 all the arms 21 can be rocked and all of the bars 20 raised or lowered, as the case may be.

The shaft 32 is equipped with an arm 36 having its free end connected with a link 37 carrying a pin 38 by which it is pivoted to one end of a link 39, the other end of which is mounted on a fixed pivot 40 on the frame. The pin 38 carries a roller running in a groove 41 and a cam wheel 42 mounted on a shaft 43 in the frame. The cam groove has an offset portion 44 which will cause the link 37 to move first downwardly and then upwardly whereby all of the bars 20 are given a quick movement downwardly followed, after a slight hesitation, by a quick upwardly movement.

The execution of this movement serves to deliver any shingles or shingle strips on the 20 to conveyors which are different in different organizations. In that shown, these conveyors are in sets corresponding to sets of bars and include a plurality of sprockets or pulleys 45, carried by four shafts 46, 47, 48 and 49, and cooperating with chains or belts 50, which run between the bars 20 and are normally below the upper surfaces of those bars whereby the conveyors can be in continuous motion, but effect the delivery of the shingles only when the bars are lowered sufficient to rest the shingles on the conveyors. The shafts 48 and 49 are equipped with sprockets 51 cooperating with a chain 52, and the shaft 49 has a gear 53 meshing with a gear 54 on a driving shaft 55.

At the right end of each bar 20 in Fig. 3, there is a stop finger 56, the fingers being arranged in sets corresponding to the bars, and serving to check the shingles as they move to the right in Fig. 3 and cause them to form a pile with their ends substantially even. These fingers must be lowered when delivery is made and raised again quickly to control the accumulation of the next set of groups.

In the form shown the fingers are carried by bars 57 extending across the machine between upright bars 58 slidably mounted on two of the corner posts 18 by studs 59 passing through slots therein. An arm 60 on the shaft 32 is loosely connected wth the bars 58 and serves to raise and lower them at the proper time.

In the manufacture of shingles as above described the strips forming each series are delivered substantially end to end at a high rate of speed. The bars 20, therefore, and the stop fingers 56, are moved downward quickly and returned quickly. The mechanism shown is so organized that they assume their normal upward position before the shingles are fully delivered by the conveyors. The fingers are provided with rollers 61 at their upper end, which contact with the lower side of the departing shingles as they rise.

An alternative mechanism for operating the fingers, which is particularly suitable where there is plenty of head room, is shown in Fig. 5.

The arm 60 of Fig. 3 is omitted, the shaft 22 is provided with an arm 62, connected by a link 63 with an arm 64 on a shaft 65, having an arm 66 at each end connected with the bars 58 by pivoted links 67.

The unit C includes four supports or tables 68, 69, 70 and 71, carried by shafts, 72, 73, 74 and 75, mounted in suitable bearings 76 on a frame 77. The shafts 72 and 73 each have a downwardly inclined arm 78, the free ends of which are connected by a link 79. The shafts 74 and 75 each have an arm 80, the free ends of which are connected by a link 81.

A bell crank 82, fulcrumed on a fixed pivot 83, has one arm connected by a pin and slot joint with one of the arms 78, and another arm 84, pivoted at 85, to a link 6 which is in turn pivoted at 7 to a reciprocating bar 86 running between guides 87 on the frame.

The arm 80 on the shaft 75 forms one arm of the bell crank, the other arm 88 of which has a pin and slot connection.

As long as the bar 86 remains in the position shown in Fig. 6, the tables or supports will remain in position to receive sub-groups of shingles 90. When the bar 86 descends the lever mechanism will cause the tables to tilt and the sub-groups of shingles will be delivered to guides or chutes formed by walls 91, 92, 93, 94 and 95, most clearly shown in Fig. 8. These guides will direct the sub-groups into a consolidated group between two adjacent vanes 96 on the conveyor D.

In order to make sure that the four sub-groups will take their proper position at all times the walls 92, 93 and 94 are provided with extensions 97, 98 and 99 (Fig. 7) which project downwardly between the vanes 96, while the walls 91 and 95 terminate slightly above and slightly between the vanes 96.

The extensions 97, 98 and 99 will, of course, have to rise before the conveyor can remove the group. For this reason they are connected to the bar 86 to travel with it, and the walls 92, 93 and 94, are provided with double sections 100, 101, 102, (Fig. 7), to receive the extensions.

Where the clearance is relatively small it will also be desirable to provide the wall 94 with a pivoted section 103 hinged at 104 and loosely connected at 105. This will permit the guides to take the position shown in diagram in Fig. 8 when the conveyor is to be moved and the position shown in Fig. 7 when sub-groups are to be consolidated.

The reciprocating bar 86 is controlled by a cam wheel 106 (Fig. 6) having a cam slot 107 receiving a roller 108 on the bar. When the wheel rotates slightly in a clockwise direction from the position shown in Fig. 6, the bar will descend tilting the tables and dropping their contents into the guides or chutes along which they descend to form a group between adjacent vanes 96. As the cam rotates the bar will be raised and the tables restored to the position shown in Fig. 6, ready to receive other groups of shingles.

Under certain conditions it is feasible to have the shingle machine deliver directly to the tables 68, 69, 70 and 71 and the unit B here disclosed may be eliminated entirely. However, the organization including the unit B permits the shingle machine of the type indicated to be run at very high speed without having the first shingle in a succeeding group arrive before its support is ready to receive it.

The conveyor D includes a plurality of chains or belts 109 connected by transverse slots and equipped with L-shaped vanes 96. The upper flight of the conveyor is substantially horizontal below unit C and then inclines upwardly, as indicated at 110 in Fig. 8, to deliver the groups of shingles to another conveyor 111 from which they are delivered to a ball table 112 at a convenient height for handling. The change from horizontal to incline is controlled by idlers 113 arranged at each side of the conveyor.

This conveyor D is driven by a step by step motion, by a pawl 114 carried by a lever 115 on a shaft 116 and cooperating with a ratchet 117. The lever 115 is connected by a link 118 with a cam lever 119, acted upon by a cam 120 on a shaft 121. One end of the cam lever 119 is fulcrumed at 122 and the other end is connected with a spring 123.

The L-shaped vanes 96 receive the groups of shingles extending on edge and deliver them to the conveyor 111 flatwise, one on top of the other. The step by step movement of the conveyor D is made in quick steps and a guide 124 (Fig. 8) is provided to prevent the groups from being disturbed as they turn over.

The several devices must be operated in timed relation and for that reason it is convenient to drive them all from the same prime mover that drives the shingle machine A. Shingles of different weights are bound in bundles of different number in order that all bundles may be within the power of the man to handle on the roof. For that reason it is necessary to change the numbers in the groups or sub-groups according to the character of the shingle being made.

Referring to Figs. 2, 9 and 10, 125 indicates a prime mover driving the shingle machine A. It is equipped with a pinion 126 meshing with a gear 127 on a jack shaft 128 equipped with a relatively long pinion 129 meshing with an adjustable pinion 130 adapted to mesh with a selected section of cone gear 131 on a shaft 132. The pinion 130 is slidably mounted on a shaft 133 and normally held in position by collars 134 and set screws 135. The shaft 133 is mounted in links 136, pivoted on the shaft 128, and has its threaded ends 137 projected through slots 138 in links 139 and adapted to receive nuts 140 by which the shaft and links are secured in a selected position.

By loosening the nuts 140 and the set screws 135, the pinion 130 may be engaged with the desired section of the cone gear 131 when, by setting up the screws 135 and the nuts 140, the parts will be held in proper relation until it is desired to change the ratio of the drive.

A sprocket or pulley 141 on the shaft 132 drives a sprocket or pulley 142 on a jack shaft 143 equipped with a sprocket or pulley 144, which drives a sprocket or pulley 145 on the shaft 43 (Fig. 3) carrying the cam wheel 42, which controls the raising and lowering of the bars 20 and the fingers 56.

The shaft 128, through a chain or belt 146 and pulleys or sprockets 147 and 148, drives the shaft 55, which drives the conveyors 50.

The shaft 43 through a belt or chain 149 drives a shaft 150 which, in turn, drives the shaft 151 on which the cam wheel 106 is mounted through beveled gears 152. The shaft 151 through a chain or belt 153 drives the shaft 121 which operates the conveyor D.

*Operation.*

The shingle machine A, by its belts 16 and 17, delivers four continuous series of shingles, two series side by side at the upper elevation and two others side by side at the lower elevation. The shingles pass from the belt over plates 154 onto the groups F, G, H, and I, of bars 20 and stop at the fingers 56. The shingles of the several series accumulate, one on the other, in number corresponding to the adjustment of transmission gearing, shown in Figs. 9 and 10. At the appropriate time the cam 42 lowers the fingers 56 and the bars 20, thereby depositing the groups, or sub-groups, on the corresponding conveyors, which deliver them to the tables 68, 69, 70 and 71. The bars 20 and fingers 56 immediately assume their normal positions and the accumulation is repeated. The cam 106 then tilts the tables 68, 69, 70 and 71, delivering the shingles to the guides which direct them into a consolidated group on the conveyor D between adjacent vanes 96. The cam 106 continuing to rotate restores the tables and the conveyor D moves one step forward. An attendant makes the necessary inspection and places boards on each side of the group. At length the group is deposited on the conveyor 111 and passed to the table 112, where it is finally prepared for binding.

I claim:

1. In a machine for grouping shingles delivered in a plurality of separate series, the combination of a plurality of sets of rails corresponding in number and position to the series of shingles delivered, a conveyor for each set of rails, intermittently operated means for causing the conveyors to remove sub-groups of shingles from the sets of rails and means for consolidating the sub-groups.

2. In a machine for grouping shingles delivered in a plurality of separate series, the combination of a plurality of sets of rails corresponding in number and position to the series of shingles delivered, means for retaining the shingles on the rails, a conveyor for each set of rails, intermittently operated means for rendering the retaining means inoperative and causing the conveyors to remove sub-groups of shingles from the sets of rails and means for consolidating the sub-groups.

3. In a machine for grouping shingles delivered in a plurality of separate series, the combination of a plurality of sets of rails corresponding in number and position to the series of shingles delivered, rotating supports for the rails, a conveyor for each set of rails and normally spaced from the surface of the rails and intermittently operated means for rotating the supports to cause the conveyors to remove sub-groups from the rails.

4. In a machine for grouping shingles delivered in a plurality of separate series, the combination of means to collect successive shingles of each series in sub-groups and means to consolidate corresponding sub-groups.

5. In a machine for grouping shingles delivered in a plurality of separate series, the combination of means for accumulating successive shingles of each series in separate sub-groups, means operating in timed relation to the delivery for discharging the sub-groups and means receiving corresponding sub-groups and consolidating them.

6. In a machine for grouping shingles delivered in separate series in different planes, the combination of means for collecting successive shingles of each series in sub-groups in corresponding different places and means to consolidate corresponding sub-groups.

7. In a machine for grouping shingles delivered in a plurality of separate series, the combination of a plurality of collecting supports corresponding in number and position to the series of shingles delivered, means for periodically removing sub-groups collected on the supports and means for consolidating corresponding sub-groups.

8. In a machine for grouping shingles delivered in a plurality of separate series, the combination of a plurality of collecting supports corresponding in number and position to the series of shingles delivered, a conveyor for removing sub-groups collected on each support, means acting periodically to simultaneously remove corresponding sub-groups from the supports and means to consolidate corresponding sub-groups.

9. In a machine of the class described, means for delivering a plurality of sub-groups of shingles at different places, corresponding supports for receiving said sub-groups, means to cause the sub-groups to be discharged from the supports, and means to direct the sub-groups to a common support in a consolidated group.

10. In a machine of the class described, a plurality of tiltable supports, means for delivering a sub-group of shingles to each support, and means to simultaneously tilt the supports and means to direct the sub-groups into a consolidated group on a common support.

11. In a machine of the class described, the combination of a plurality of supports, intermittently operated means for delivering a sub-group of shingles to each support, intermittently operated means for simultaneously delivering the sub-groups from the supports, and means for directing the sub-groups into a consolidated group and means for receiving the consolidated group.

12. In a machine of the class described, the combination of a plurality of tiltable supports, means for delivering shingles to the supports in sub-groups, means for tilting the supports to discharge the sub-groups and guides receiving the sub-groups and directing them to a common support in a consolidated group.

13. In a machine for the class described, the combination of a plurality of tiltable supports, means for delivering shingles to the supports in sub-groups, means for tilting the supports to discharge the sub-groups and guides consolidating the sub-groups, a conveyor receiving the consolidated groups and means for driving the conveyor in timed relation to the tilting of the supports.

14. In a machine of the class described, the combination of a plurality of supports adapted to receive shingles one by one and collect them into sub-groups, means for shifting the supports to discharge the sub-groups, a corresponding number of supports for receiving the sub-groups, means for shifting the last mentioned supports to discharge the sub-groups and guides for consolidating the groups, and a support for receiving the consolidated groups.

15. In a machine of the class described, the combination of a plurality of shiftable supports for receiving shingles in different positions, means for shifting the supports to discharge the shingles, and guides receiving the discharged shingles and directing them to a common support.

16. In a machine of the class described, the combination of a plurality of supports receiving shingles one by one endwise and delivering them in sub-groups endwise, a plurality of supports receiving the sub-groups endwise and delivering them sidewise, and guides directing all the shingles to a corresponding support edgewise.

17. In a machine of the class described, the combination of a plurality of supports receiving shingles one by one endwise and delivering them in sub-groups endwise, a plurality of supports receiving the sub-groups endwise and delivering them sidewise, guides directing corresponding sub-groups into consolidated groups standing on edge and a conveyor receiving the consolidated groups and delivering them on the side.

18. In a machine of the class described, a plurality of supports, means for delivering a sub-group of shingles to each support, lever mechanism for shifting the supports to discharge the sub-groups, a reciprocating bar for operating the lever mechanism, and means to direct the sub-groups into a consolidated group on a common support.

19. In a machine of the class described, a plurality of supports, means for delivering a sub-group of shingles to each support, lever mechanism for shifting the supports to discharge the sub-groups, a reciprocating bar for operating the lever mechanism and a timing cam for operating the reciprocating bar.

20. In a machine of the class described, a plurality of similarly disposed rotatably mounted supports, means for delivering a sub-group of shingles to each support, means for rotating the supports including a reciprocating member and lever devices connecting each support with the reciprocating member and means to direct the sub-groups into a consolidated group on a common support.

21. In a machine of the class described, a plurality of similarly disposed rotatably mounted supports, means for delivering a sub-group of shingles to each support, means for rotating the supports including a reciprocating member, a timing cam for reciprocating the member, and lever devices connecting each support with the reciprocating member and means to direct the sub-groups into a consolidated group on a common support.

22. In a machine of the class described, a plurality of similarly disposed supports mounted to rotate about parallel axes, means for delivering a sub-group of shingles to each support, a common operating member for said supports, lever devices connecting the supports with the common operating member and means to direct the sub-groups into a consolidated group on a common support.

23. In a machine of the class described, a plurality of substantially horizontal supports, a shaft on which each support is mounted, a lever on each shaft, a reciprocating member and connections between the several levers and the reciprocating member whereby all the supports are operated in unison, means for delivering a sub-group of shingles to each support and means for directing the sub-groups into a consolidated group.

24. In a machine of the class described, a plurality of parallel shafts mounted on a frame, a support carried by each shaft, means for delivering a sub-group of shingles to each support, a lever on each shaft, a common operating member for all the levers and connections between them and the common operating member, and means for shifting the operating member to tilt all the supports simultaneously.

25. The combination of a shingle machine, a shingle grouping machine, a prime mover driving both of said machines and transmission for the shingle grouping machine including driven gears of different size mounted to rotate about a common axis, a driving gear spaced from the driven gears, a shaft mounted to swing about the axis of the driving gear and an intermediate gear meshing with the driving gear and shiftable along the shaft to mesh with a selected driven gear.

26. The combination of a shingle machine, a shingle grouping machine, a prime mover driving both of said machines and transmission for the shingle grouping machine including a driven shaft, driven gears of different size mounted on the driven shaft, a driving shaft parallel to the driven shaft, a driving gear on the driving shaft, an intermediate shaft, a pair of links rotatably mounted on the driving shaft, a second pair of links rotatably mounted on the driven shaft, an intermediate shaft adjustably supported by the otherwise free ends of both pairs of links and an intermediate gear adjustable axially along the intermediate shaft to mesh with the driving gear and a selected driven gear.

In testimony whereof I affix my signature.

ALBERT E. F. MOONE.